June 6, 1967 G. B. KUEHNE ETAL 3,323,821
HERMETIC SEAL STRUCTURES AND METHOD OF MAKING THE SAME
Filed Dec. 31, 1963 2 Sheets-Sheet 1

INVENTORS
GERHARD B. KUEHNE
WERNER P. SCHULZ
BY    OSKAR HEIL

Robert W. Ditto
Leon F. Herbert
ATTORNEY

INVENTORS
GERHARD B. KUEHNE
WERNER P. SCHULZ
OSKAR HEIL
BY Robert W. Dilts
Leon F. Herbert
ATTORNEY

United States Patent Office 3,323,821
Patented June 6, 1967

3,323,821
HERMETIC SEAL STRUCTURES AND METHOD OF MAKING THE SAME
Gerhard B. Kuehne, Santa Clara, Werner P. Schulz, San Bruno, and Oskar Heil, San Mateo, Calif., assignors, by mesne assignments, to Varian Associates, a corporation of California
Filed Dec. 31, 1963, Ser. No. 334,723
4 Claims. (Cl. 287—189.365)

This invention relates to hermetic seals and more particularly to such seals involving a non-melt pressure bond.

Modern technology finds many uses for hermetic seals between dielectric and metal members. The problem is that the coefficient of expansion of the dielectric member is usually quite different from that of the metal member. The problem is particularly severe when the dielectric is quartz.

One proposed solution to the problem is to join to the dielectric member a very weak metal sealing piece which is joined in turn to the metal member. However, certain metals which are best suited for the weak sealing piece are not suited to being brazed to the metal member. For example, when a thin gold ring is used as the sealing piece, it is practically impossible to braze it to a copper metal member because the gold tends to be used up in the eutectic alloy.

When the materials involved make it difficult to braze the sealing ring to the metal member, the parts are joined together by a pressure seal. A pressure seal is now conventional in the art and is a seal formed by forcing two metal pieces together with substantial pressure, usually at elevated temperature, but always below the melting temperatures of the metals involved.

The art of pressure sealing is now well developed as regards the understanding that both pressure and heat are required. However, prior to this invention, the apparatus and method employed for pressure sealing involved some separate mechanical means for generating the force required to supply the necessary pressure.

One of the objects of the present invention is to provide a more efficient method and apparatus for making pressure seals.

More specifically, an object of the invention is to provide a method and apparatus for making pressure seals wherein the separate energy normally required to provide the necessary pressure is eliminated, and the heat which is required anyway is made to provide the additional function of creating the necessary pressure.

Another and related object of the invention is to provide a method and apparatus for making pressure seals between circular surfaces, successful prior art pressure seals having been limited to flat surfaces.

A further object of the invention is to provide an improved hermetic seal structure which incorporates the benefits made possible by the improved method of the invention.

An additional object of the invention is to provide hermetic seal structures involving a thin, weak, non-brazeable sealing ring and a brazeable sealing ring whereby the weak ring can be bonded to the dielectric member and the brazeable ring can be brazed to the main metal member.

By way of brief description, the invention involves a hermetic seal structure having a weak metal sealing piece, such as gold, pressure sealed to a dielectric member, such as quartz, and another sealing piece of a different metal, such as copper, pressure sealed to the weak sealing piece. The pressure seal is made by placing at least one pressure member on one side of the seal pieces and employing the coefficient of expansion of the pressure member to cause the seal piece to be forced together by the thermal energy which is required to heat the seal surfaces. In the preferred embodiment, the sealing pieces and pressure members involved are all in the shape of rings and the pressure seal is made between circular surfaces.

These and other objects and features of advantage will be fully apparent to those skilled in the art from a reading of the following description which makes reference to the accompanying drawings, in which.

Figure 1:
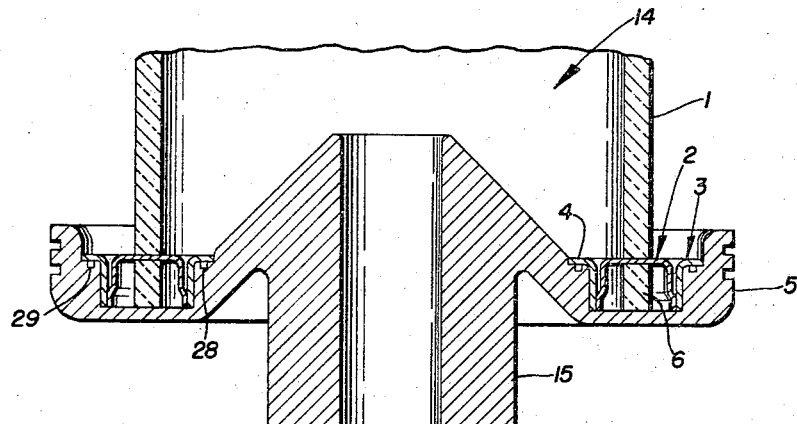
FIGURE 1 is a sectional view on the axis of a specific hermetic seal structure embodying the invention.

Referring in more detail to the drawings, FIGURE 1 shows a hermetic seal structure made according to the invention. The structure comprises a dielectric member 1, a first sealing piece 2, two second sealing pieces 3 and 4, a metal member 5, and a dielectric backing member 6.

Figure 3:
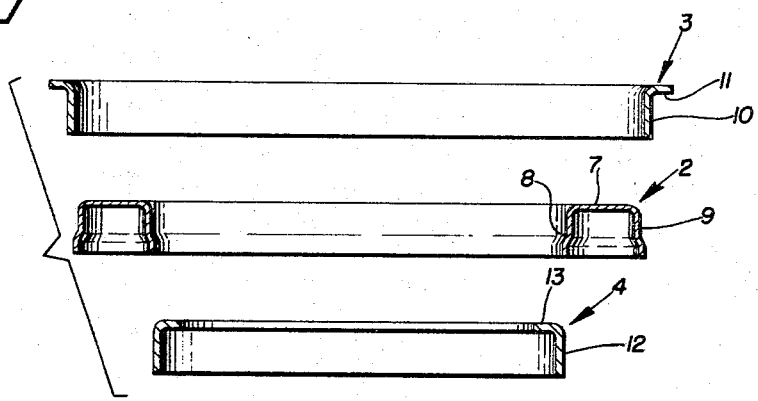
FIGURE 3 is an exploded view of the sealing ring unit of FIGURE 2.

In the specific embodiment shown, the dielectric member is a quartz cylinder forming part of the wall of the evacuated envelope of a klystron. The first sealing piece 2 is a thin gold ring having a U-shaped cross section forming a center or bight portion 7 and leg portions 8 and 9 as designated in detail in FIGURE 3. The second sealing piece 3 is a copper ring havin an L-shaped cross section forming a leg portion 10 and a foot portion 11. Similarly, sealing piece 4 is a copper ring having an L-shaped cross section forming a leg portion 12 and a foot portion 13. Metal member 5 is a relatively massive copper piece which, together with the quartz cylinder 1, forms part of the vacuum envelope. Member 5 serves as one wall of a resonant cavity indicated at 14 and carries a drift tube segment 15 through which an electron beam passes according to conventional klystron operation.

The dielectric cylinder is preferably made of quartz because of the various advantageous electrical and mechanical qualities of quartz. Quartz has a coefficient of expansion that is lower than any metal so that a sealing ring can be bonded to the quartz only if it is weak enough that its thermal expansion and contraction will not overpower and crack the quartz. Gold is a preferred metal for a sealing ring bonded to quartz. Accordingly, ring 2 is made of gold bonded in conventional manner to the end of quartz cylinder 1 and to the adjacent end of the backing ring 6 which is also made of quartz. Backing ring 6 serves the dual purpose of restraining the center portion of gold ring 2 against thermal movement relative to quartz cylinder 1 and also relieving U-shaped ring 2 of the axial load caused by atmospheric pressure forcing cylinder 1 and member 5 together.

Since it is relatively impossible to braze the thin gold ring 2 to the massive copper member 5, ring 2 is pressure sealed to the copper rings 3 and 4 which can be brazed to the member 5. The pressure seals are made adjacent the ends of rings 2, 3 and 4 as indicated by the arrows 16 and 17 in FIGURE 2. The brazes are made between member 5 and the feet 11 and 13 of the rings 3 and 4.

Figure 2:
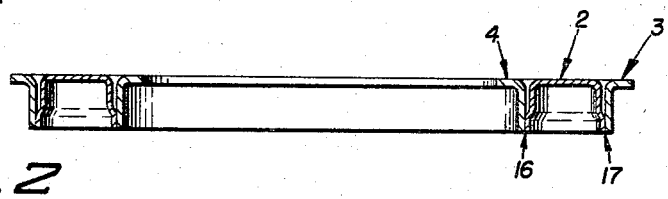
FIGURE 2 is a separate cross-sectional view of the sealing ring portion of FIGURE 1.
Figure 4:
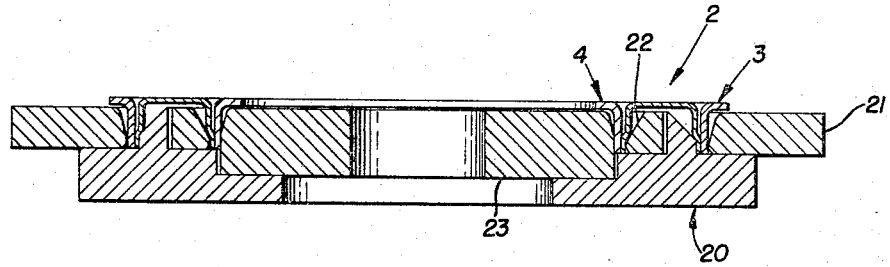
FIGURE 4 is a cross-sectional view showing the formation of the sealing ring unit of FIGURE 2.
Figure 5:
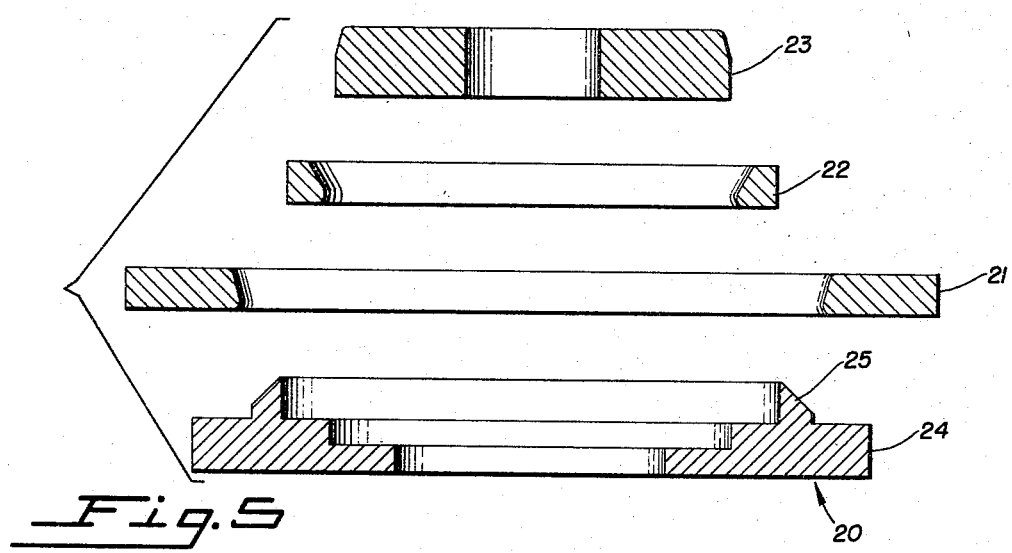
FIGURE 5 is an exploded view of the pressure rings of FIGURE 4.

The method of making the structure shown in FIGURE 1 comprises first the preparation of the sealing ring structure shown in FIGURE 2. FIGURE 4 shows the apparatus for forming the pressure seals between the rings 2, 3 and 4. More specifically, the apparatus comprises pressure rings 20–23. Ring 20 forms a base for receiving and jigging all of the rings 2, 3, 4, 21, 22, and 23. As designated in FIGURE 5, ring 20 has a base portion 24 and a ring portion 25. Rings 20 and 23 are made of a metal having a relatively high coefficient of expansion, and rings 21 and 22 are made of a metal having a relatively low coefficient of expansion. In one preferred example, rings 20 and 23 are a stainless steel known as number 303, and rings 21 and 22 are made of molybdenum.

After the various rings are assembled as shown in FIGURE 4, the assembly is heated, preferably in a vacuum, to a sufficient temperature for a sufficient time to cause pressure seals to be formed at 16 and 17. For example, with the specific metals previously described, ten minutes at 850° C. has been found suitable. As will be understood by those skilled in the art, the high temperature causes the rings 25 and 23 to expand outwardly more than rings 21 and 22 so that legs 9 and 10 are pressed between rings 25 and 21, and legs 8 and 12 are pressed between rings 23 and 22. When the rings are allowed to cool, the pressure rings separate and the sealing ring unit of FIGURE 2 is removed. In order to prevent the pressure rings from adhering to the sealing rings, the pressure rings are oxidized, as by heating in wet hydrogen.

After the sealing ring unit of FIGURE 2 has been formed, the quartz cylinder 1 and the quartz backing ring 6 are bonded to the center portion 7 of the gold ring 2. Finally, the quartz cylinder with the sealing ring unit attached is positioned as shown in FIGURE 1 and passed through a brazing furnace. Prior to passing through the furnace, a wire of brazing material is positioned in the grooves 28 and 29.

Figure 6:
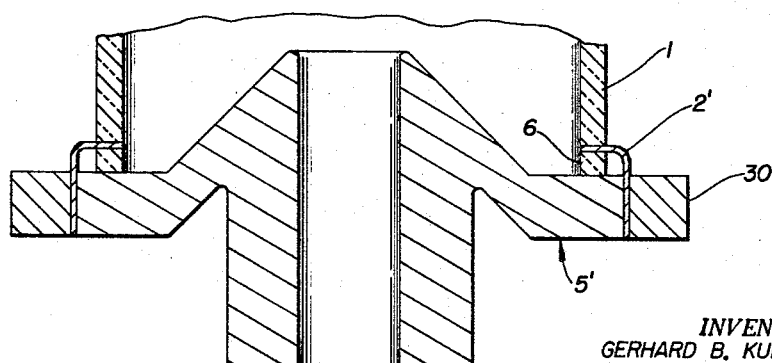
FIGURE 6 is a sectional view of a modified seal structure showing the pressure ring in place.

FIGURE 6 shows a version of the invention wherein only one pressure member is required. More specifically, it should be understood that if the gold sealing piece is joined to another sealing piece which is relatively strong and massive, the other sealing piece can serve the additional function of being a pressure member. In FIGURE 6, the gold sealing ring 2′ has an L-shaped cross section and is pressure sealed to the outside rim of the copper member 5′. The seal is formed by placing around the rim of member 5′ a ring 30 of a metal, such as molybdenum, which has a lower coefficient of expansion than the copper member 5′ and then heating. As the member 5′ expands relative to ring 30, the gold ring 2′ is pressed between the rim of member 5′ and ring 30. Thus, member 5′ is both a sealing piece and a pressure member. After the seal is formed, the temperature is reduced and the sealed unit shrinks away from ring 30 which is then removed.

Although preferred embodiments of the present invention are shown and described herein, it is to be understood that modifications may be made therein without departing from the spirit and scope of the invention as set forth in the appended claims.

Having then described the invention, what is claimed as new and desired to be secured by Letters Patent is:

1. A hermetic seal structure comprising a dielectric member and a metal member, a first sealing piece made of gold bonded to the dielectric member, a second sealing piece made of copper, a pressure seal bonding said first and second sealing pieces together, and a braze joint bonding said second sealing piece to said metal member.

2. A hermetic seal structure comprising a quartz cylinder, an annular gold sealing ring having a U-shaped cross section, the bight portion of the U-shaped ring being bonded to the end of said cylinder with the legs of the U-shaped ring facing away from said cylinder, a first copper L-shaped sealing ring surrounding the outer leg of said U-shaped ring with the foot of the L facing away from said U-shaped ring, a second copper L-shaped sealing ring inwardly of the inner leg of said U-shaped ring with the foot of the second L-shaped ring facing away from said U-shaped ring, pressure bonds between the legs of said L-shaped rings and the ends of the respectively adjacent legs of said U-shaped ring, a metal end member extending across the end of the U-shaped ring and having portions thereof adjacent the feet of said L-shaped rings, and braze bonds between the feet of said L-shaped rings and said metal end member.

3. A sealing ring structure comprising a thin annular gold sealing ring having a U-shaped cross section, two copper sealing rings, said U-shaped ring being sandwiched radially between said two copper rings, and a pressure bond connecting said copper rings to the respectively adjacent legs of the gold U-shaped ring.

4. The method of making a hermetic seal structure having a quartz member with an annular sealing surface, a gold sealing ring, a copper sealing ring, and a copper metal member, said method comprising the steps of forming a pressure seal between said gold ring and said copper ring, bonding said gold ring to said quartz annular surface, and brazing said copper ring to said copper metal member.

References Cited

UNITED STATES PATENTS

| | | | |
|---|---|---|---|
| 2,650,683 | 9/1953 | McPhee | 29—472.9 X |
| 2,654,940 | 10/1953 | Law | 29—447 X |
| 3,036,674 | 5/1962 | Branin | 29—472.9 X |
| 3,050,613 | 8/1962 | Sheinhartz | 29—447 X |
| 3,115,957 | 12/1963 | Heil | 287—189.365 |

WILLIAM I. BROOKS, *Primary Examiner.*

JOHN F. CAMPBELL, WHITMORE A. WILTZ,
*Examiners.*